United States Patent [19]

Sudnishnikov et al.

[11] Patent Number: 4,850,437

[45] Date of Patent: Jul. 25, 1989

[54] SINGLE-BLOW PNEUMATIC PERCUSSIVE TOOL

[76] Inventors: Vadim B. Sudnishnikov, Krasny prospekt, 56, kv. 59; Andrei A. Zelentsov, ulitsa Sverdlova, 11, kv. 1, both of Novosibirsk, U.S.S.R.

[21] Appl. No.: 241,976

[22] PCT Filed: Nov. 20, 1986

[86] PCT No.: PCT/SU86/00118

§ 371 Date: Jul. 19, 1988

§ 102(e) Date: Jul. 19, 1988

[87] PCT Pub. No.: WO88/03855

PCT Pub. Date: Jun. 2, 1988

[51] Int. Cl.[4] .......... B23Q 5/00

[52] U.S. Cl. .......... 173/13; 173/90; 91/422

[58] Field of Search .......... 173/13–17, 173/90, 134; 91/422; 227/130

[56] References Cited

U.S. PATENT DOCUMENTS

| | | | |
|---|---|---|---|
| 2,960,067 | 11/1960 | Osborne | 227/130 X |
| 3,193,024 | 7/1965 | Cleary | 173/17 |
| 3,273,657 | 9/1966 | Willems et al. | 173/15 X |
| 3,405,602 | 10/1968 | Novak | 91/422 X |
| 3,802,516 | 4/1974 | Speicher | 175/15 |
| 3,803,983 | 4/1974 | Amtsberg | 173/134 X |

FOREIGN PATENT DOCUMENTS

| | | |
|---|---|---|
| 617109 | 7/1978 | U.S.S.R. . |
| 683828 | 9/1979 | U.S.S.R. . |
| 770778 | 10/1980 | U.S.S.R. . |
| 837456 | 6/1981 | U.S.S.R. . |
| 946912 | 7/1982 | U.S.S.R. . |

*Primary Examiner*—Frank T. Yost
*Assistant Examiner*—James L. Wolfe
*Attorney, Agent, or Firm*—Lilling & Greenspan

[57] ABSTRACT

A single-blow pneumatic percussive tool comprises a hollow cylindrical casing (1) accommodating a reciprocatable hammer piston (2) which divides the interior space of the casing (1) into an upper and a lower chambers (3, 4). A spring-biased valve (5) is mounted on the side of the lower chamber (4) and a working member (6) is secured to the valve (5). An air distribution device (7) is mounted on the side of the upper chamber (3) and has passages (8, 9, 10) and a control lever (11). The hammer piston (2) has an axial passage (13) in which a tube (14) is mounted which has a shoulder (15) on the outer surface and a continuous inner partition wall (16). The tube (14) has upper and lower ports (17, 18) disposed on either side of the partition wall (16). An air distribution sleeve (19) biassed by spring on the side of the air distribution device (7) is mounted on the tube (14) and has an inner recess (21). The air distribution sleeve (19) is movable under the action of the hammer piston (2) to the upper position in which it covers the lower ports (18) and the air distribution sleeve (19) is movable under the action of a spring means (20) to the lower position defined by the shoulder (15), in which it establishes communication between the upper and lower ports (17, 18) through the inner recess (21).

1 Claim, 2 Drawing Sheets

SINGLE-BLOW PNEUMATIC PERCUSSIVE TOOL

TECHNICAL FIELD

The invention relates to pneumatic percussive tools used in the construction and mining industries, mechanical engineering and metallurgy, and more specifically, it deals with single-blow pneumatic percussive tools.

Background of the Invention

Pneumatic percussive tools, in particular, pneumatic hammers are used for marking, center-popping, riveting, marking-out and gate trimming. Depending on a specific application, the pneumatic hammer has a working member such as a stamp, center punch or chisel mounted in a casing having an interior space. The interior space of the casing accommodates a hammer piston dividing the interior space of the casing into an upper chamber and a lower chamber. An air distribution device is mounted on the casing. An energy carrier is compressed air which is supplied to the tool from a portable or stationary compressor along a flexible hose. During operation of the tool, the hammer piston axially reciprocates under the action of a gaseous fluid under pressure admitted to the working chambers through the air distribution device following the command of the operator to impart a blow to the end of the working member at every working cycle. The working member performs work under the action of blows whereby, depending on the type of the working member, marking, center-popping, trimming or riveting takes place.

Since operations performed by pneumatic hammers are effected with the direct participation of the operator, such hammers are to have minimum weight and size.

Known in the art is a single-blow pneumatic percussive tool (cf. USSR Inventor's Certificate No. 946912, Int. Cl. B 25 D 9/00), comprising a hollow cylindrical casing accommodating a reciprocatable hammer piston and an air distribution device disposed in a handle mounted on the casing. The hammer piston divided the casing interior into lower and upper chambers. The tool also has a tube adapted to establish communication between the lower chamber and gaseous fluid under pressure at regular intervals.

In this tool, the tube is mounted outside the casing so that auxiliary devices should be provided outside the tool. As a result, the size and weight of the tool held by the operator are increased.

Known in the art is a single-blow pneumatic percussive tool (cf. USSR Inventor's Certificate No. 683828, Int. Cl. B 21 C 51/00), comprising a hollow cylindrical casing accommodating a reciprocatable hammer piston dividing the interior space of the casing into upper and lower chambers. A spring-biased valve to which a working member is secured is mounted on the side of the lower chamber. An air distribution device having passages and a control lever is mounted on the side of the upper chamber. A tube for supplying gaseous fluid under pressure into the interior space of the chamber is mounted outside the casing.

The arrangement of the tube outside the casing leads to large size and heavy weight of the tool held by the operator.

SUMMARY OF THE INVENTION

The main object of the present invention is to provide a single-blow pneumatic percussive tool with such arrangement of a tube which would make it possible to reduce size of the tool.

This object is accomplished by that in a single-blow pneumatic percussive tool comprising a hollow cylindrical casing accommodating a reciprocatable hammer piston which divides the interior space of the casing into an upper chamber and a lower chamber, a spring-biased valve having a working member secured thereto and mounted on the side of the lower chamber for establishing communication of the lower chamber with atmosphere at regular intervals, an air distribution device having passages and a control lever, mounted on the casing on the side of the upper chamber and establishing communication of the upper chamber with gaseous fluid under pressure and atmosphere via the passages at regular intervals, a tube for admitting gaseous fluid under pressure to the lower chamber at regular intervals, and a retainer for retaining the hammer piston in the upper position, according to the invention, the hammer piston has an axial passage and the tube is mounted in this passage and has an outer shoulder, a continuous internal partition wall and upper and lower ports provided on either side of the internal partition wall, a spring-biased air-distribution sleeve urged away from the air distribution device is mounted on the tube and has an inner recess, the sleeve being movable under the action of the hammer piston towards the upper position in which the inner surface thereof covers the lower ports and being movable under the action of the spring into the lower position defined by the shoulder in which it establishes communication between the upper and lower ports via the inner recess for supplying gaseous fluid under pressure to the lower chamber for moving the hammer piston upwards.

This construction of the tool makes it possible to minimize its weight and size because the tube and air distribution means are disposed inside the tool.

BRIEF DESCRIPTION OF DRAWINGS

The invention will now be described with reference to the accompanying drawings showing a specific embodiment thereto in which.

BEST MODE FOR CARRYING OUT THE INVENTION

Figure 1:
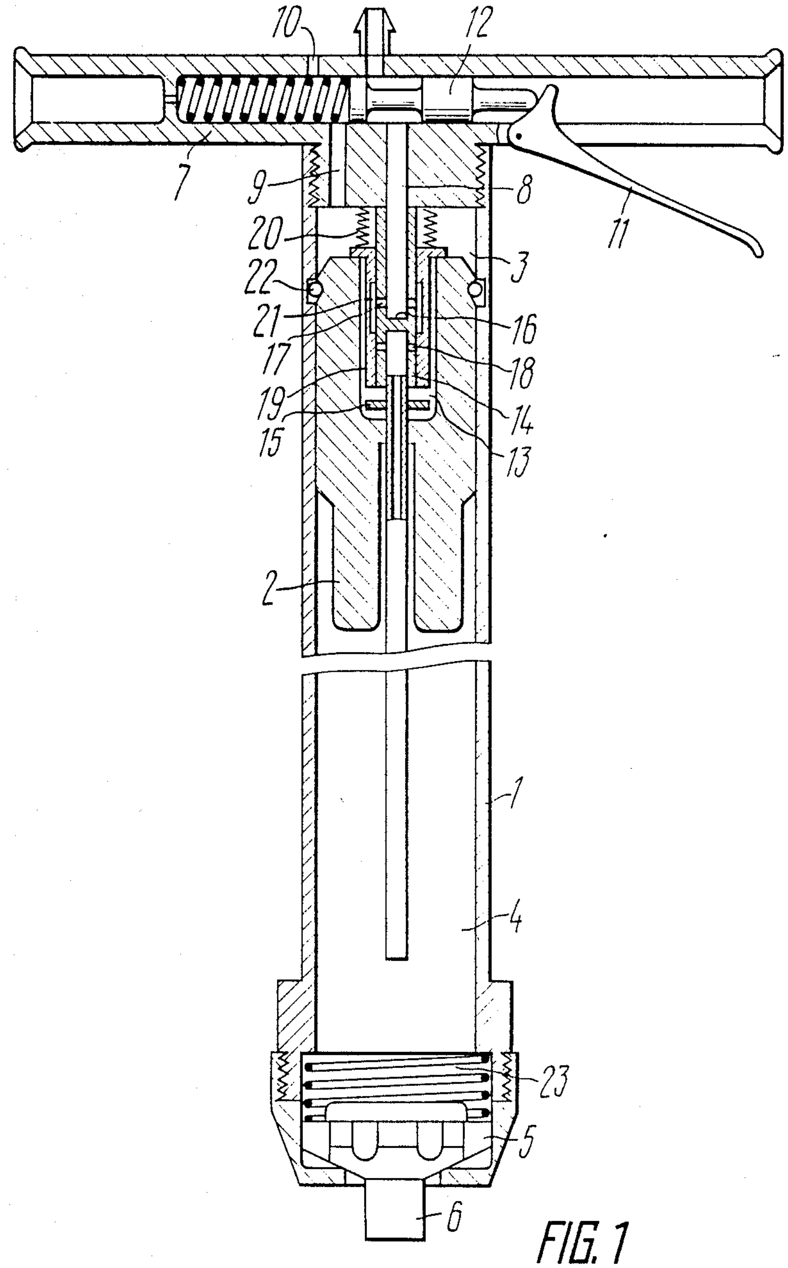
FIG. 1 schematically shows a single-blow pneumatic percussive tool according to the invention with the hammer piston in the uppermost position, in longitudinal section.
Figure 2:
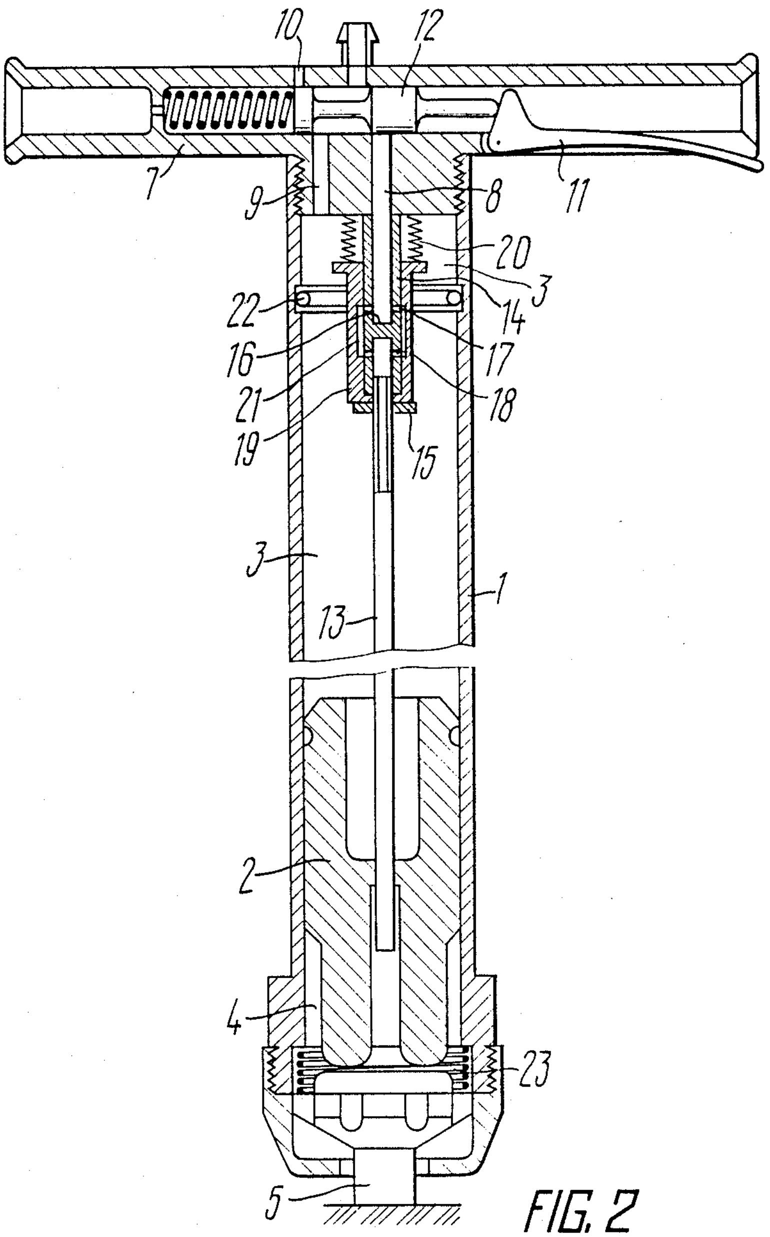
FIG. 2 schematically shows a single-blow pneumatic percussive tool according to the invention with the hammer piston in the lowermost position, in longitudinal section.

A single-blow pneumatic percussive tool shown in FIGS. 1, 2 comprises a hollow cylindrical casing 1 accommodating a reciprocatable hammer piston 2 which divides the interior space of the casing 1 into an upper chamber 3 and a lower chamber 4. A spring-biased valve 5 to which is secured a working member 6 is mounted on the side of the lower chamber 4. The valve 5 establishes communication of the lower chamber 4 with atmosphere at regular intervals. An air distribution device 7 having passages 8, 9 and 10 and a control lever 11 cooperating with a spring-biased spool valve 12 are mounted on the side of the upper chamber 3. The upper chamber 3 alternately communicates, via the passages 8, 9, 10 of the air distribution devices 7, with gaseous fluid under pressure and with atmosphere.

An axial passage 13 is made in the hammer piston 2 and a tube 14 having an outer shoulder 15 and a continuous inner partition wall 16 is mounted in this passage. In this embodiment, the tube 14 is made composite of two tubes of different diameters. It should be noted that the tube may also be made integral. The tube 14 has upper ports 17 above the partition wall 16 and lower ports 18 below the partition wall 16. An air distribution sleeve 19 is movably mounted on the tube 14. A spring 20 engageable with the air distribution sleeve 20 is mounted on the side of the air distribution device 7. An inner recess 21 is made in the sleeve 19 for establishing communication between the upper and lower ports 17, 18 for admitting gaseous fluid under pressure to the lower chamber 4. The hammer piston 2 has a retainer 22 for retaining the hammer piston in the uppermost position.

The single-blow pneumatic percussive tool functions in the following manner.

Gaseous fluid under pressure is admitted through a socket pipe of the air distribution device 7 (FIG. 1), spool valve 12, passage 8, upper ports 17, recess 21, lower ports 18 and tube 14 to the lower chamber 4 and acts upon the hammer piston 2 to move the latter to the upper position. The hammer piston 2 will move the air distribution sleeve 19 by its upper end face to compress the spring 20 so that the sleeve will cover with its inner surface the lower ports 18 and gaseous fluid under pressure will cease to get into the lower chamber 4, the hammer piston 2 being retained in the uppermost position by the retainer 22. The upper chamber 3 will thus communicate with atmosphere through the passages 9. 10 of the air distribution device 6. When the valve 5 (FIG. 2) is moved (depressed) into the interior of the casing 1, the lower chamber 4 communicates with atmosphere through the now open valve 5, and gaseous fluid under pressure is discharged from the lower chamber 4 into atmosphere. When the control lever 11 is depressed so as to move the spool valve 1, the passages 8 and 10 are shut-off, and gaseous fluid under pressure is admitted, via the passage 9, to the upper chamber 3 to act upon the end face of the hammer piston 2 retained by the retainer 22. As soon as pressure in the upper chamber reaches a preset value, the hammer piston 2 is released to move to the lower position (FIG. 2). The air distribution sleeve 19 will be moved by the spring 20 to the lowermost position defined by the shoulder 15 so as to establish communication between the upper and lower ports 17, 18 through the recess 21, and gaseous fluid under pressure is discharged from the lower chamber 4 through the spring-biased valve 5 into atmosphere. At the end of travel, the hammer piston 2 delivers a blow at the spring-biased valve 5 to which is secured the working member 6 which is in contact with a workpiece surface to perform useful work. If the tool is lifted above the workpiece surface, the valve 5 is moved by the spring 23 to the lowermost position so as to interrupt communication of the lower chamber 4 with atmosphere. When the control lever 11 is released (FIG. 1), the spool valve 12 will move so as to open the passages 8 and 10, and admission of gaseous fluid under pressure through the passage 9 is interrupted. The upper chamber 3 will communicate with atmosphere through the passages 9 and 10. Gaseous fluid under pressure is admitted to the lower chamber 4 through the passage 8, upper ports 17, recess 21, lower ports 18 and tube 14 to act upon the end face of the hammer piston 2. The hammer piston 2 will start moving towards the upper position under the action of fluid under pressure on the side of the lower chamber 4. During its movement, the hammer piston 2 engages the air distribution sleeve 19 to move it to the upper position and to compress the spring 20. The air distribution sleeve 19 will cover the lower ports 18 with its inner surface, and gaseous fluid admission to the lower chamber 4 is interrupted, and the hammer piston 2 is retained by the retainer 22. The cycle is then repeated.

In comparison with prior art single-blow pneumatic percussive tools, the tool according to the invention makes it possible to arrange the tube and air distribution means in the interior of the tool thus reducing the tool size and improving its ergonomic characteristics.

INDUSTRIAL APPLICABILITY

The invention may be most advantageously used in tools designed for marking, center-popping, riveting, marking-out and gate trimming.

The invention may also be used in apparatuses for mining working roof trimming, for demolishing concrete, making holes and performing other operations in the construction industry.

What is claimed is:

1. A single-blow pneumatic percussive tool comprising a hollow cylindrical casing (1) accommodating a reciprocatable hammer piston (2) which divides the interior space of the casing (1) into upper and lower chambers (3, 4), a spring-biased valve (5) having a working member (6) secured thereto and mounted on the side of the lower chamber (4) for establishing communication of the lower chamber (4) with atmosphere at regular intervals, an air distribution device (7) having passages (8, 9, 10) and a control lever (11) mounted on the casing (1) on the side of the upper chamber (3) and establishing communication of the upper chamber (3) with gaseous fluid under pressure and atmosphere via the passages (8, 9, 10) of the air distribution device (7) at regular intervals, a tube (14) for admitting gaseous fluid under pressure to the lower chamber (4) and a retainer (22) for retaining the hammer piston (2) in the upper position, characterized in that the hammer piston (2) has an axial passage (13) and the tube (14) is mounted in this passage (13) and has an outer shoulder (15), a continuous internal partition wall (16) and upper and lower ports (17, 18) provided on either side of the internal partition wall (16), a spring-biased air distribution sleeve (19) urged away from the air distribution device (7) is mounted on the tube (14) and has an inner recess (21), the sleeve (19) being movable under the action of the hammer piston (2) towards the upper position in which the inner surface thereof covers the lower ports (18) and being movable under the action of the spring (20) into the lower position defined by the shoulder (15) in which it establishes communication between the upper and lower ports (17, 18) via the inner recess (21) for supplying gaseous fluid under pressure to the lower chamber (4) for moving the hammer piston (2) upwards.

* * * * *